United States Patent
Chi et al.

(10) Patent No.: US 11,201,856 B2
(45) Date of Patent: Dec. 14, 2021

(54) MESSAGE SECURITY

(71) Applicant: INTERNATIONAL BUSINESS MACHINES CORPORATION, Armonk, NY (US)

(72) Inventors: Wen-Ping Chi, New Taipei (TW); Chao Yuan Huang, Taipei (TW); Yi-Chun Chen, Taipei (TW); Ting-Yi Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/544,977

(22) Filed: Aug. 20, 2019

(65) Prior Publication Data

US 2021/0058380 A1 Feb. 25, 2021

(51) Int. Cl.
*H04L 29/06* (2006.01)
*H04L 9/08* (2006.01)

(52) U.S. Cl.
CPC ........ *H04L 63/0435* (2013.01); *H04L 9/0827* (2013.01); *H04L 63/08* (2013.01); *H04L 63/18* (2013.01)

(58) Field of Classification Search
CPC ............ G06F 9/44; G06F 13/10; G06F 17/30; H04W 12/10; H04W 12/04; H04W 4/00; H04W 74/08; H04L 29/06; H04L 29/08; H04L 9/06; H04L 63/08; H04L 63/0435; H04L 9/0827; H04L 9/3215; H04L 63/18
See application file for complete search history.

(56) References Cited

U.S. PATENT DOCUMENTS

| 5,751,813 A | 5/1998 | Dorenbos |
| 6,654,883 B1 | 11/2003 | Tatebayashi |
| 6,993,772 B2 * | 1/2006 | Pike ........................ G06F 9/451 719/321 |

(Continued)

FOREIGN PATENT DOCUMENTS

| CA | 2224661 C | 11/1997 |
| WO | 2017156417 A1 | 9/2017 |

OTHER PUBLICATIONS

Akram et al., "End-To-End Secure and Privacy Preserving Mobile Chat Application", HAL archives-ouvertes.fr, 8th IFIP International Workshop on Information Security Theory and Practice (WISTP), Jun. 2014, Heraklion, Crete, Greece, pp. 124-139.

(Continued)

*Primary Examiner* — Thanhnga B Truong
(74) *Attorney, Agent, or Firm* — Rakesh Roy

(57) ABSTRACT

A method, computer system, and a computer program product for securing message transmission is provided. The present invention may include linking, by a first terminal device, a communication interface to a first communication channel for a target application. The present invention may include, in response to a first message being inputted in the communication interface, encrypting, by the first terminal device, the first message with a key for the first communication channel. The present invention may include, transmitting, by the first terminal device, the encrypted first message via the first communication channel.

18 Claims, 9 Drawing Sheets

(56) References Cited

U.S. PATENT DOCUMENTS

| | | | |
|---|---|---|---|
| 7,437,756 B2* | 10/2008 | Bleumer | G07B 17/0008 |
| | | | 726/17 |
| 9,154,477 B2 | 10/2015 | Cambridge | |
| 9,628,449 B1* | 4/2017 | Statica | H04L 63/08 |
| 9,935,979 B2 | 4/2018 | Brander | |
| 10,237,247 B2 | 3/2019 | Marlow | |
| 2006/0101473 A1* | 5/2006 | Taylor | G06F 9/546 |
| | | | 719/314 |
| 2015/0350163 A1 | 12/2015 | Brander | |
| 2015/0358825 A1* | 12/2015 | Dinan | H04W 12/037 |
| | | | 380/274 |
| 2017/0353842 A1 | 12/2017 | Gordon | |

OTHER PUBLICATIONS

Mell et al., "The NIST Definition of Cloud Computing", Recommendations of the National Institute of Standards and Technology, Special Publication 800-145, Sep. 2011, 7 pages.

\* cited by examiner

MESSAGE SECURITY

BACKGROUND

Embodiment of the present disclosure relates to processing information within a network environment, and more specifically, to processing message associated with message security.

Individuals may communicate and exchange data with their families, friends, and business contacts over a network. Inevitably, communication contents and exchanged data may involve privacy and secret information. As transmitted on the network, the information may be intercepted, monitored and analyzed by an untrusted third party. Therefore, risk posed by information leakage may become significant.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Embodiments of the present invention disclose a method, computer system, and a computer program product for securing message transmission. The present invention may include linking, by a first terminal device, a communication interface to a first communication channel for a target application. The present invention may include, in response to a first message being inputted in the communication interface, encrypting, by the first terminal device, the first message with a key for the first communication channel. The present invention may include, transmitting, by the first terminal device, the encrypted first message via the first communication channel.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
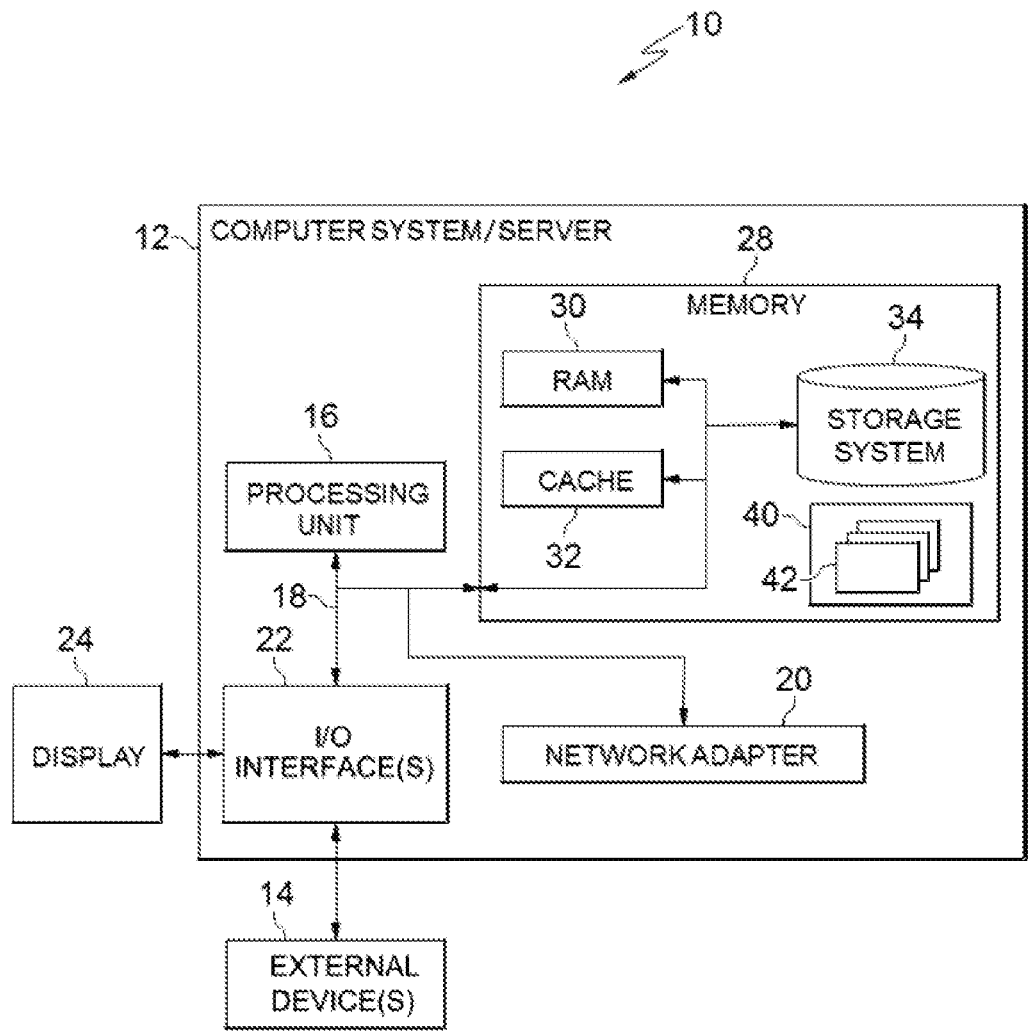
FIG. 1 illustrates a cloud computing node according to at least one embodiment.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

Cloud computing node 10 may include a computer system/server 12 or a portable electronic device such as a communication device, which may be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that may be accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, etc.

Figure 2:
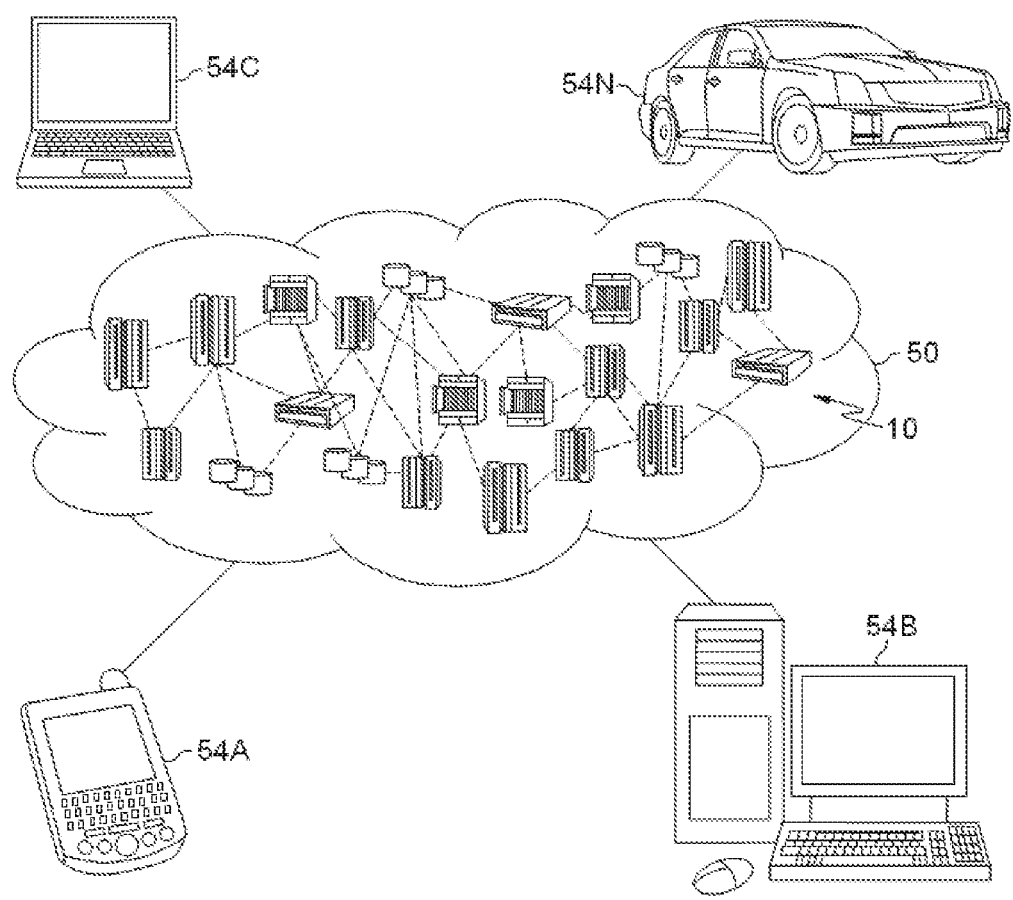
FIG. 2 is a block diagram of an illustrative cloud computing environment including the cloud computing node depicted in FIG. 1, in accordance with an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
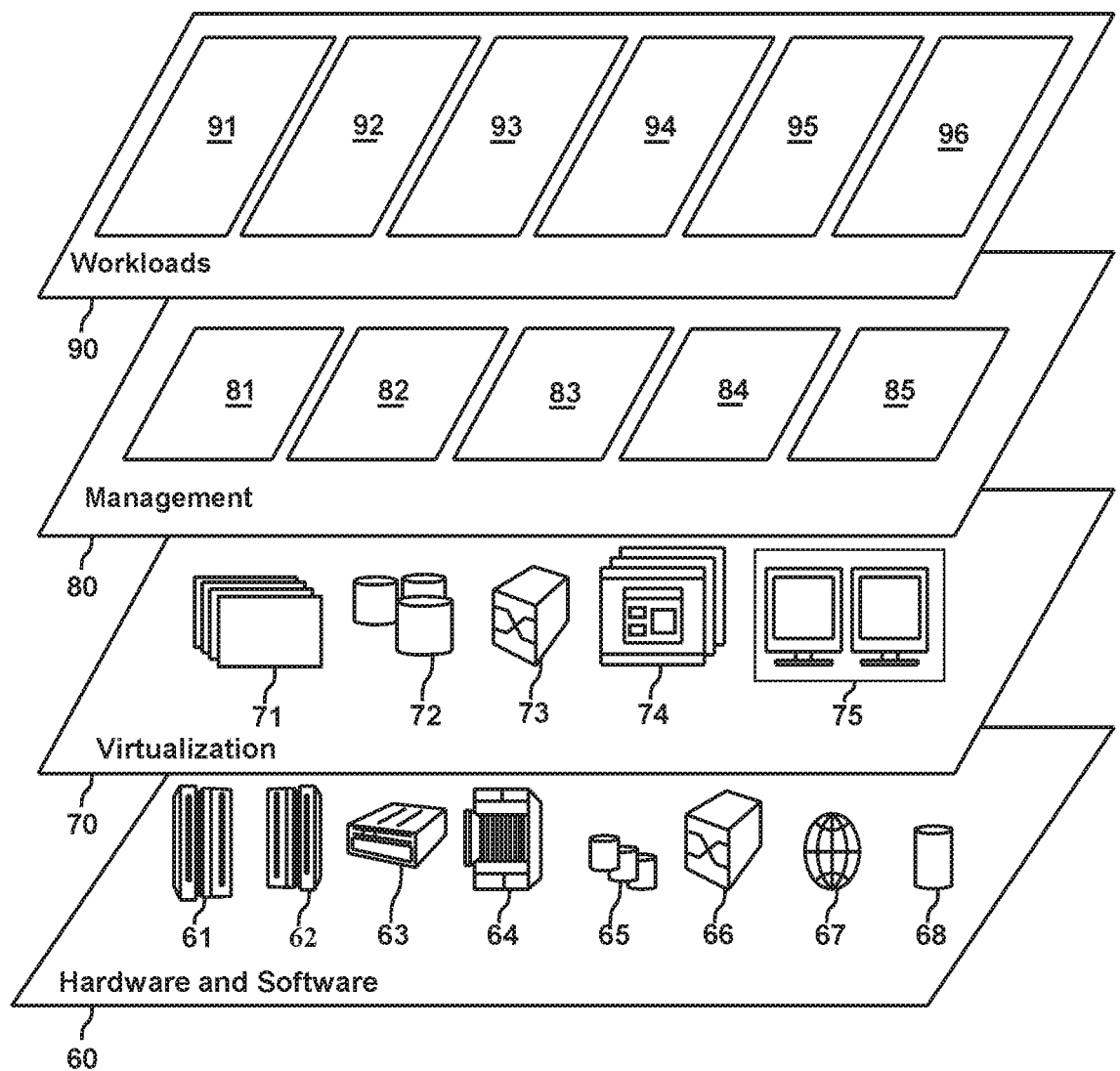
FIG. 3 is a block diagram of functional layers of the illustrative cloud computing environment of FIG. 2, in accordance with an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message securing 96.

Generally, messaging applications do not have an end-to-end encryption function to prevent eavesdropping on messages during transmission. Even if some of the messaging applications have their secure transfer modes, their black box implementations may not provide sufficient protection for communication contents in a high security level, such as, for example, communication contents regarding business information.

Embodiments of the present disclosure may provide a method for securing message transmission.

Figure 4:
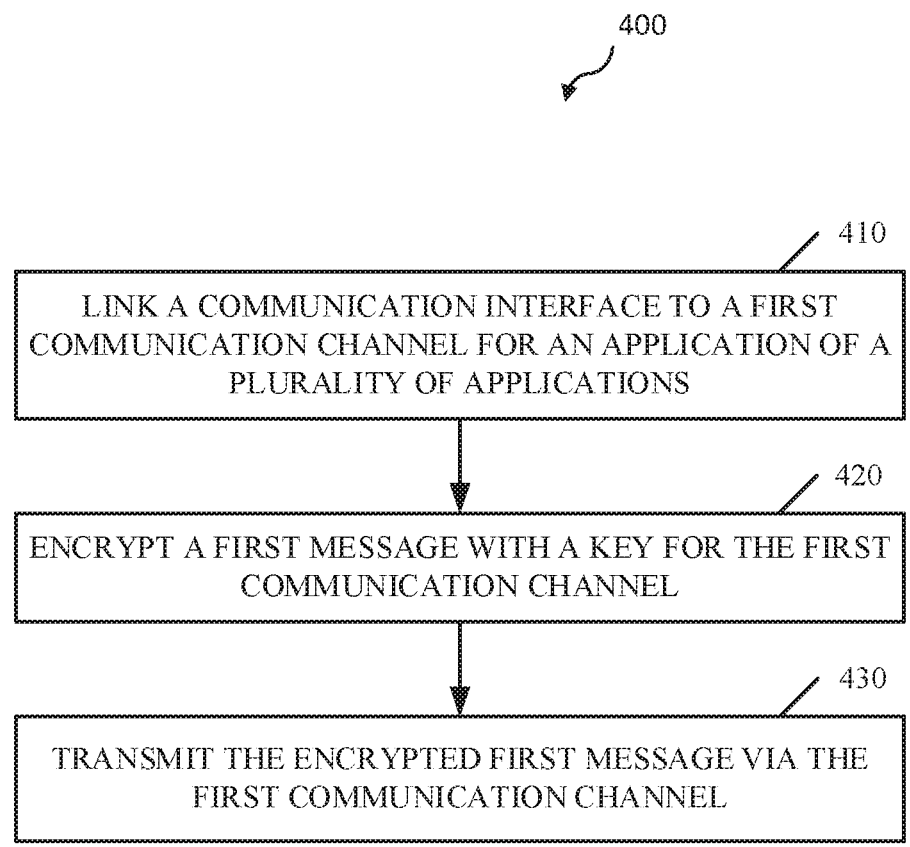
FIG. 4 is an operational flowchart illustrating a process for securing message transmission according to at least one embodiment.

Referring now to FIG. 4, an operational flowchart illustrating the exemplary process 400 for securing message transmission according to at least one embodiment is depicted.

According to one embodiment, the process 400 for securing message transmission may be implemented by a module in a terminal device in a messaging system for exchanging data over a network. The messaging system may include two or more terminal devices, such as, mobile stations or user equipment. For example, the terminal device may include, but is not limited to, a mobile phone, a portable digital assistants (PDAs), a smart phone, and a tablet. The respective terminal device in the messaging system may interact with the network to obtain resources from one or more servers or one or more other terminal devices.

Figure 5:
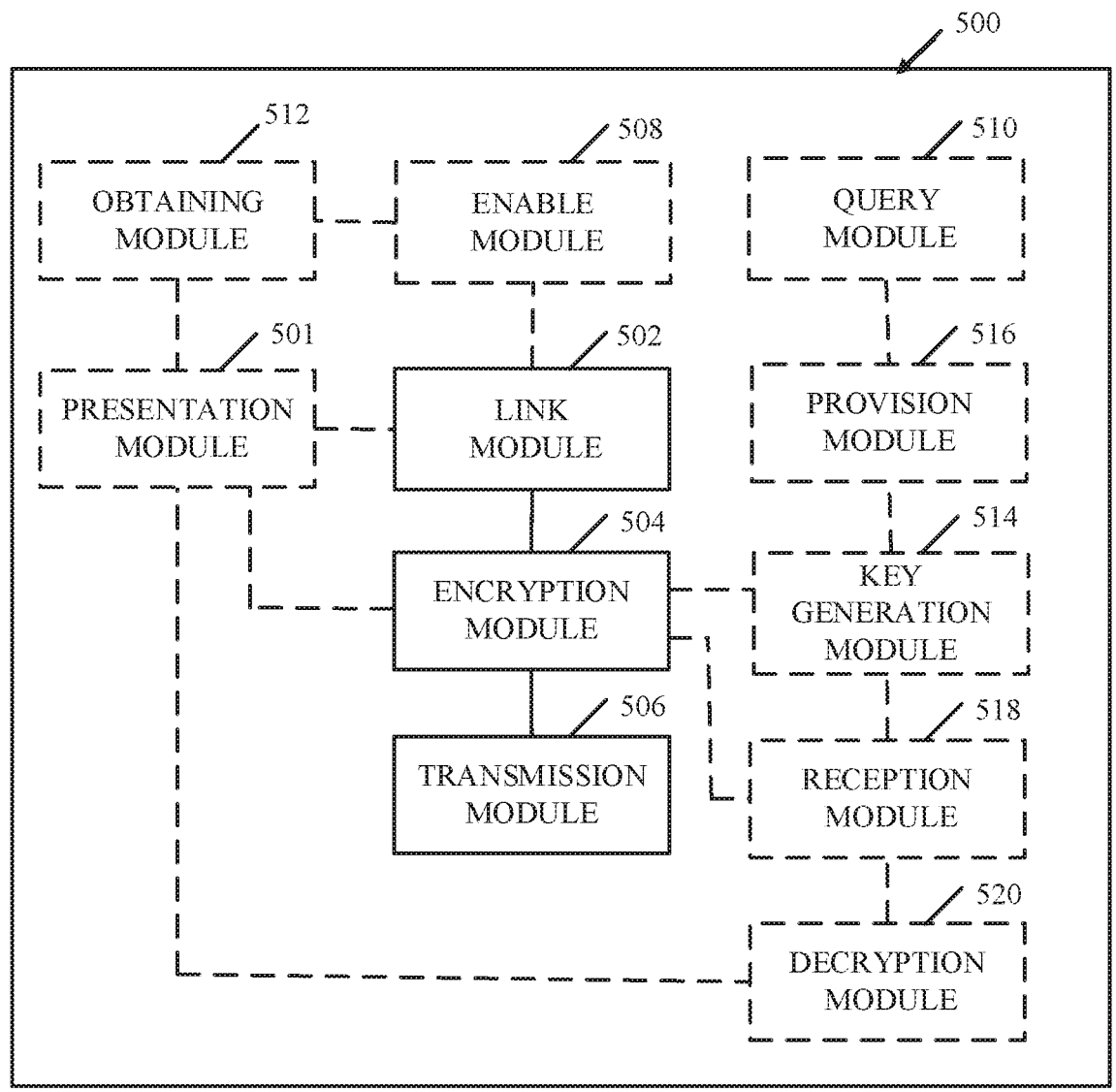
FIG. 5 is a block diagram of an illustrative module in a terminal device according to at least one embodiment.

FIG. 5 shows a schematic diagram of an example of a module 500 in a terminal device according to an embodiment of the present disclosure. The method shown in FIG. 4 may be implemented by the module 500. As FIG. 5 shows, the module 500 may comprise a link module 502, an encryption module 504, and a transmission module 506, which are indicated by solid blocks. Moreover, the terminal device may additionally comprise, but is not limited to, at least one of the following modules: a presentation module 501, an enable module 508, a query module 510, an obtaining module 512, a key generation module 514, a provision module 516, a reception module 518, and a decryption module 520, which are indicated by dashed blocks. In some embodiments, the modules indicated by the dashed blocks may be optional. In one embodiment, coupling relationships between the modules may not be limited to the illustrated coupling relationships. In at least one embodiment, other suitable coupling relationships may exist between the modules to implement the present disclosure.

In some embodiments, the terminal device may host a plurality of applications. The plurality of applications may include, but are not limited to, one or more messaging applications, (e.g., applications which may be used to exchange information and/or messages between devices). In some embodiments, a communication channel may be created between a messaging application on the terminal device and one or more corresponding messaging applications on one or more other terminal devices. The respective messaging application on the terminal device may be communicatively coupled to the module 500 of the terminal device. It is to be noted that, for the purpose of discrimination, each of the one or more other terminal devices may be referred to as a contact terminal device for convenience hereinafter. Moreover, the contact terminal device may also be provided with the module 500 in FIG. 5.

In one embodiment, the communication channel may be implemented as a communication session between users of two terminal devices or a communication group among users of three or more terminal devices. In some embodiments, the number of terminal devices on a communication channel may include any number of terminal devices.

As shown in FIG. 4, at block 410, the link module 502 links a communication interface to a first communication channel for an application of a plurality of applications. The communication interface may correspond to the plurality of applications on the terminal device. The application may be referred to as a target application.

In an embodiment of the present disclosure, the presentation module 501 may first present an application selection interface on a display screen of the terminal device. In some embodiments, the application selection interface may also be the communication interface. The application selection interface may represent a plurality of link indicators for the plurality of applications on the terminal device. Each link indicator may indicate a link to one of the applications, for example, via an application program interface ("API"). Therefore, the application selection interface may enable a user of the terminal device to select the target application from the plurality of applications. Accordingly, the obtaining module 512 may obtain a selection of the target application, for example, based on an input from the user.

In some embodiments, the enable module 508 may enable the first communication channel for the target application, in response to the target application being selected. For example, the first communication channel may be created for the target application. Accordingly, the reception module 518 may receive a request for joining the first communication channel from one or more contact terminal devices. Therefore, the one or more contacts may join the communication via the first communication channel upon an approval of the user of the terminal device.

Moreover, the presentation module 501 may present a contact selection interface on the display screen. In some embodiments, the contact selection interface may also be the communication interface. The contact selection interface may enable the user of the terminal device to select one or more contacts from a plurality of contacts in the target application. For example, in response to the obtaining module 512 obtaining the selection of the target application, the presentation module 501 may present the plurality of contacts in the target application. Therefore, the obtaining module 512 may further obtain a selection of the one or more contacts, for example, based on an input from the user via the input device.

In some embodiments, the enable module 508 may also enable the first communication channel, in response to a contact in the target application being selected. Therefore, the first communication channel may be created between the target application on the terminal device and the target application on the contact terminal device corresponding to the selected contact.

In some other embodiments, the first communication channel may already exist in the network. For example, the first communication channel may be created by another terminal device, referred to as a host terminal device, or a server. The host terminal device may or may not be the contact terminal device. Then, the transmission module 506 may transmit a request for joining the first communication channel, in response to a selection of the target application. For example, the transmission module 506 may search the first communication channel and transmit the request in response to the first communication channel being found. In one embodiment, the searching method may employ any searching schemes known in the art. If the request is approved, for example, by the host terminal device or the server, the target application on the terminal device may join the first communication channel. In one embodiment, the joining method may employ any joining schemes known in the art.

In a further embodiment, the terminal device may be registered with the server. The query module 510 may query the server to retrieve information corresponding to the contact terminal device. For example, the information may indicate a registration status of the contact terminal device. The registration status indicates whether the contact terminal device is registered to the server. In some embodiments, a list of registered terminal devices may be stored in a database, such that the query module 510 may query the server to check the database to search for the contact terminal device from the list. Moreover, the information may also indicate an Internet Protocol ("IP") address of the contact terminal device. For example, the IP address of the registered terminal devices may be stored in a database. Then, the query module 510 may query the server to check the database to determine the IP address of the contact terminal device. It is to be noted that any query methods known in the art may be used to implement the retrieving above. Then, the target application on the contact terminal device may ask to join the first communication channel. If the request is approved, for example, by the host terminal device or the server, the target application on the contact terminal device may join the first communication channel too.

After the first communication channel is created or joined, the link module 502 may link the first communication channel to the communication interface via, for example, an API. Accordingly, the presentation module 501 may present the communication interface on the display device.

At block 420, the encryption module 504 encrypts a first message with a key for the first communication channel. The first message may be inputted, for example, by the user of the terminal device, in the communication interface.

In some embodiments, the obtaining module 512 may obtain the first message from a user input. Therefore, the presentation module 501 may present the first message in the communication interface.

Moreover, the key generation module 514 may generate the key. In some embodiments, the key may be specific to the first communication channel. In one embodiment, the key generation process may employ any key generation methods known in the art.

In a further embodiment, the provision module 516 may provide the key to the contact terminal device. For example, the provision module 516 may provide the key to the contact terminal device based on the information corresponding to the contact terminal device, in response to the information of the contact terminal device being retrieved from the query module 510. Some illustrative provision schemes will be described as below.

In an embodiment, the provision module 516 may enable a second communication channel between the first terminal device and the contact terminal device. In some embodiments, the second communication channel may be established by the first terminal device. For example, the establishing process may be based on the IP address of the contact terminal device. Then, the provision module 516 may transmit the key to the contact terminal device via the second communication channel. Specifically, the second communication channel may be independent from the first communication channel. Therefore, the key transmitted on the second communication channel may not be accessible by the target application or any untrusted third-party devices. In some other embodiments, the second communication channel may be established by other devices or server.

In another embodiment, if the registration status indicates that the contact terminal device is registered to the server and the server is a trusted authority, the server may be configured as a means for transmitting the key. For example, the provision module 516 may transmit the key to the server, and then the server may send the key to the contact terminal device.

In still another embodiment, the provision module 516 may also transmit the key to the contact terminal device by using a trusted third-party key sharing device. For example, the trusted third-party key sharing device may obtain the key from the provision module 516, and then provide the key to the second user.

Based on the above provision schemes, the provision module 516 of the terminal device may provide the key to the respective contact terminal device.

Moreover, in some other embodiments, the reception module 518 may receive the key from the server or the host terminal device, when the key is generated by the server or the host terminal device. For example, the transmission module 506 may transmit a request to the server or the host terminal device to join the first communication channel and to obtain the key. The server or the host terminal device may transmit the key to the query module 510 as a response.

As the key is generated or obtained, the encryption module 504 may encrypt the first message with the key. Based on the above, the key may be inaccessible to the target messaging application or any untrusted third-party device.

In some embodiments, the key used to encrypt the first message may be a symmetric key. Therefore, the encrypted first message may also be decrypted by the same key.

As shown in FIG. 4, at block 430, the transmission module 506 transmits the encrypted first message via the first communication channel, for example, to the one or more contact terminal devices. In some embodiments, the provision module 516 may provide the key via the second communication channel to the one or more contact terminal devices. Then the one or more contact terminal devices may decrypt the encrypted second message with the key.

Furthermore, the reception module 518 may receive an encrypted second message, for example, from the one or more contact terminal devices, via the first communication channel. Moreover, the decryption module 520 may decrypt the encrypted second message with the key sent by the second communication channel. Then, the presentation module 501 may further present the second message in the communication interface.

Generally, each user may have a respective identification for an application. In one embodiment, the identification may be a unique identification for each user. Therefore, when receiving a message, the user may know who is sending the message based on the identification. Embodiments of the present disclosure may provide a method for hiding the identification of the user communicated via the communication channel.

In an embodiment, the provision module 512 may provide a credential to the at least one contact terminal device. The credential may represent the identification for the user using the target application on the terminal device and the identification for the respective contact using the target application on the respective contact terminal device.

In another embodiment, the reception module 518 may receive a credential from the server or the host terminal device. Therefore, the received credential may also represent the identification for the user using the target application on the terminal device and the identification for the respective contact using the target application on the respective contact terminal device.

Therefore, in one embodiment, some or all the users communicating via the communication channel may be represented by a same identification, (e.g., the credential). A real identification for the user and the respective contact may be hidden (e.g., not disclosed).

In a further embodiment, in order to prevent a user from pretending to be another user, a public-private key may be employed to further identify the real identification for the user. The key generation module 514 may further hold a public-private key for the user. The private key may be used to further encrypt the first message. The encrypted first message may then be decrypted by the corresponding public key. The public key for the user may be stored in a database, which can be accessible by the authorized users.

For example, when the reception module 518 receives an encrypted message from a contact terminal device used by a user who claims an identification USER1, the decryption module 520 may try to decrypt the encrypted message with the corresponding public key for USER1. If the message can be decrypted by the public key, the identification of the user is authenticated. Otherwise, the user of the contact terminal device may be disguised with a fake identification.

In some embodiments, the encryption and decryption schemes described above may employ any encryption and decryption algorithm known in the art, such as, Advanced Encryption Standard (AES) algorithm or Data Encryption Standard (DES) algorithm.

In some embodiments, the message, including the first message and the second message, transmitted on the first communication channel may be in any kind of data format, such as, text, image, video, sound, or a combination thereof.

For example, the communication interface may be presented as a dialog box, such that the first user may input the text message in the dialog box.

According to embodiments of the present disclosure, the message may be encrypted and decrypted in the communication interface of the respective terminal device. In one embodiment, the message may be presented as a plaintext in the communication interface and may be transmitted as a ciphertext on the communication channel on the target messaging application. Therefore, the communication contents or exchanged data may not be available to unexpected third parties. Accordingly, the present disclosure may improve security of message transmission on the messaging application.

It can be noted that the messaging system described above may be implemented as a cloud computing environment 50 shown in FIG. 2. In the cloud computing environment 50, the terminal device and the server may be implemented as a cloud computing node 10, respectively. The respective module may be implemented, as program modules 42, by the program/utility 40 stored in the memory 28 in FIG. 1. The respective module may be executed by the processing unit 16 to perform the method for message securing according to the embodiments of the present disclosure. It is to be noted that some modules may be used independently, while some others may be used in combination with another module. Moreover, additional or alternative modules may be included in the module 500.

In some embodiments, an application program for message securing may be provided as a message securing module based on the method in FIG. 4 and the module 500 in FIG. 5. The message securing module may be coupled to the messaging applications on the terminal device. Examples of the message securing module will be described below.

Moreover, a plugin for message securing may also be provided based on the process 400 in FIG. 4 and the module 500 in FIG. 5. The message securing plugin may be coupled to the respective messaging application through API, headless browser, or the like.

Examples of the messaging system in combination with securing message transmission processes according to embodiments of the present disclosures are described hereinafter.

Figure 6:
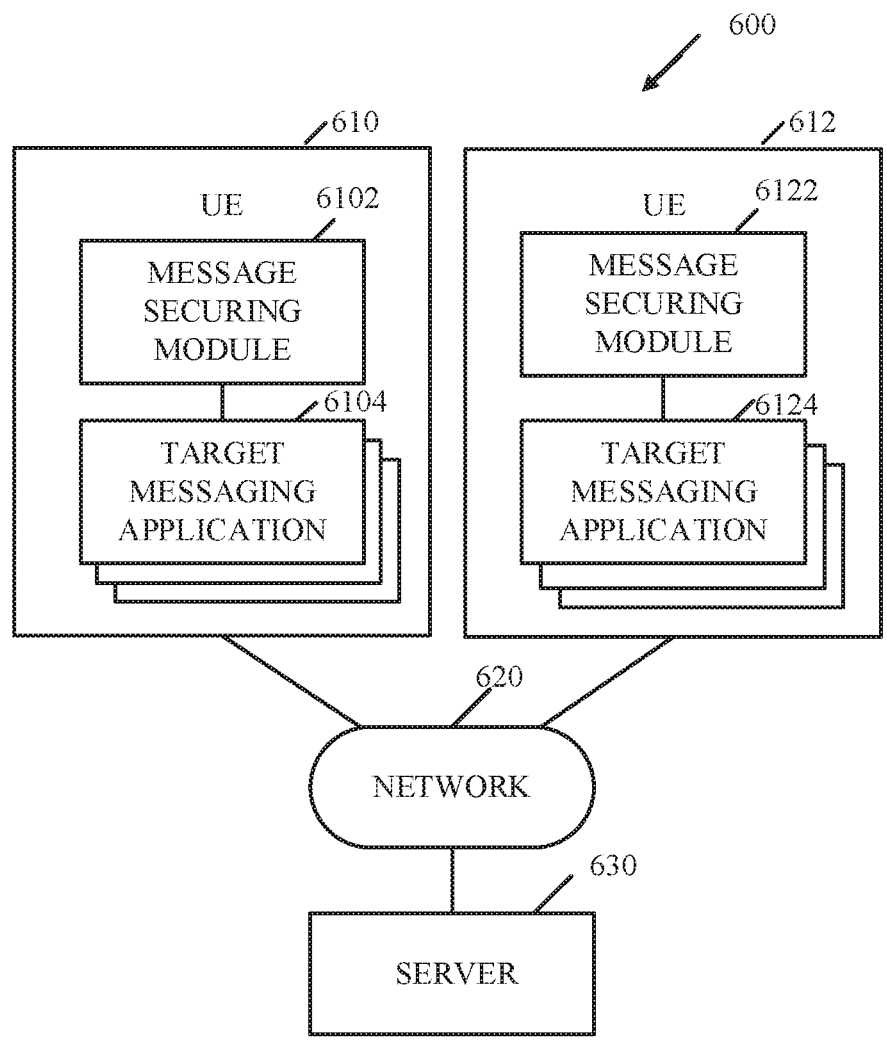
FIG. 6 is a block diagram of an illustrative messaging system according to at least one embodiment.

Referring now to FIG. 6, a block diagram illustrating an exemplary messaging system 600 according to an embodiment of the present disclosure is depicted. As FIG. 6 shows, the messaging system 600 may include a user equipment ("UE") 610 and a UE 620. The UE 610 and UE 612 may include the terminal device 500 shown in FIG. 5.

Each of the UE 610 and UE 612 may host a message securing module and a number of messaging applications. As shown in FIG. 6, a message securing module 6102 may be coupled to a target messaging application 6104 of a number of messaging applications in UE 610. A message securing module 6122 may be coupled to a target messaging application 6124 of a number of messaging applications in UE 612. The UE 610 may be communicatively coupled to the UE 612, and a server 630 over a network 620.

Figure 7:
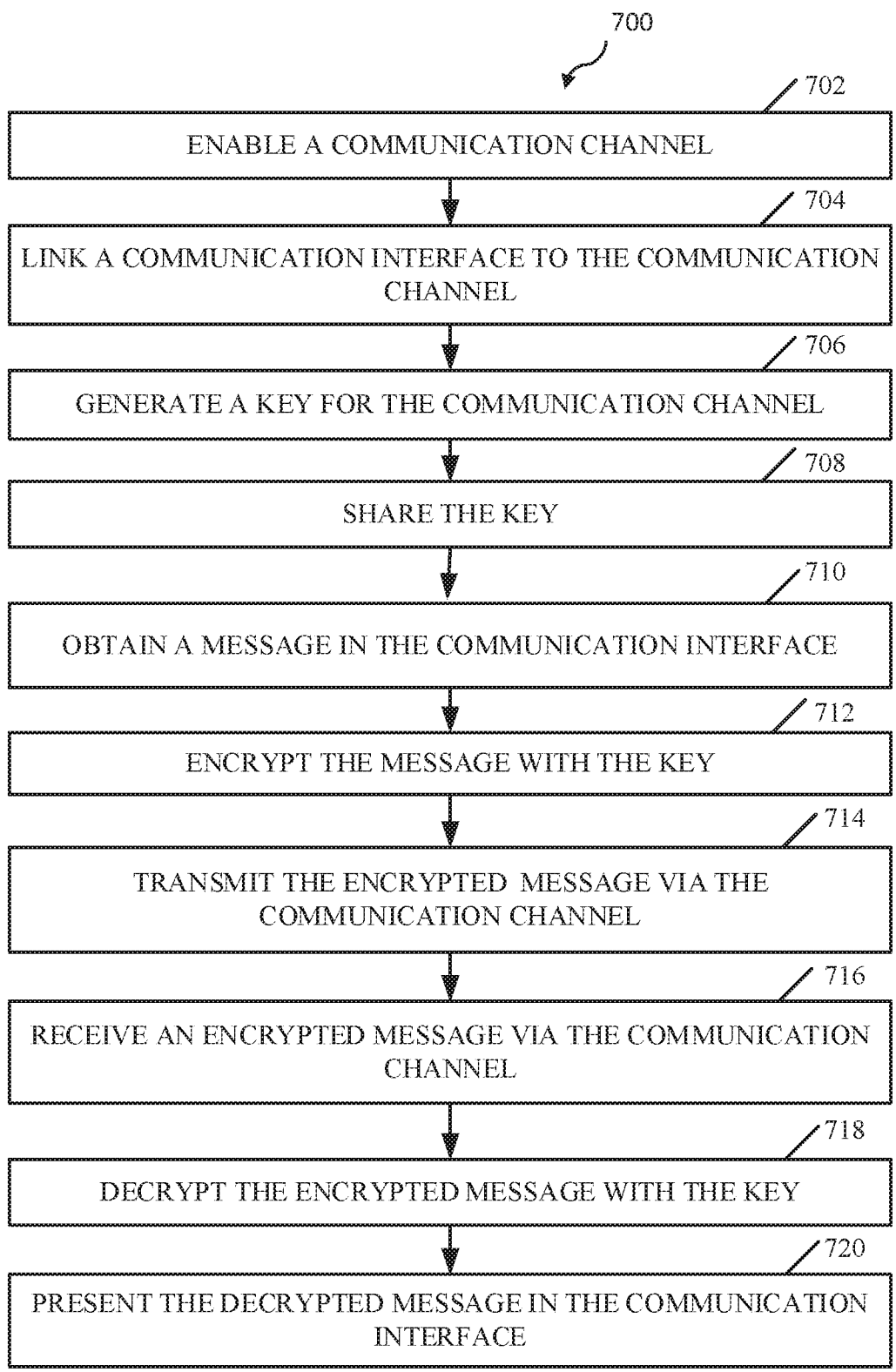
FIG. 7 is an operational flowchart illustrating a process for message securing using the messaging system of FIG. 6, according to at least one embodiment.

Referring additionally to FIG. 7, an operational flowchart illustrating the exemplary process 700 for securing message transmission in the messaging system 600 in FIG. 6 according to an embodiment of the present disclosure is depicted.

In an embodiment, the message securing module 6102 may present an application selection on a communication interface on a display screen of the UE 610. The application selection may include a plurality of messaging application indicators, each messaging application indicator being linked to the respective messaging application on the UE 610. The first user using the UE 610 may select the target messaging application 6104 of the messaging applications. Further, the message securing module 6102 may present a contact selection on the communication interface. The contact selection may include a plurality of contacts in the target messaging application. The first user may further select a contact to communicate with. For example, the selected contact may include a second user using the UE 612. Therefore, the message securing module 6102 may receive a signal indicating the target messaging application 6104 and the second user.

According to one embodiment, the message securing application 6102 may be registered with the server 630 such that the first user may query the server 630 to retrieve information corresponding to the UE 612. The information may include, for example, a registration status of the UE 612, an IP address of the UE 612, or the like.

At block 702, in response to the registration status indicating the UE 612 being registered to the server 630, the message securing module 6102 may enable a communication channel between the message securing module 6102 and message securing module 6122 for the target messaging application over the network. It can be noted that the communication channel may be supported by a messaging service provider (not shown) of the target messaging application. Thus, the communication contents transmitted via the communication channel may be accessible by the messaging service provider.

Accordingly, at block 704, the message securing module 6102 may link a communication interface to the communication channel. In one embodiment, the communication interface may correspond to the plurality of messaging applications. The plurality of message applications may share the communication interface. Moreover, the message securing module 6102 may present the communication interface on a display screen of the UE 610.

At block 706, the message securing module 6102 may generate a key for the communication channel. The key may be a symmetric key.

When the key is ready, at block 708, the message securing module 6102 may share the key with the message securing module 6122.

For example, the message securing module 6102 may establish an additional communication channel with the message securing module 6122 to transmit the key to the message securing module 6122 via the addition communication channel. The additional communication channel may be independent from the communication channel. Thus, the key transmitted via the additional communication channel may not be accessible by the messaging service provider. In another example, the message securing module 6102 may transmit the key to the message securing module 6122 via the server, if the server is a trusted authority. Otherwise, the message securing module 6102 may transmit the key to the message securing module 6122 by using a trusted third-party key sharing device.

In another embodiment, at block 706, the server 630 may generate the key for the first communication channel. Then, at block 708, the server 630 may transmit the key to the message securing module 6102 and the message securing module 6122 respectively. Therefore, the key may be shared between the message securing module 6102 and the message securing module 6122.

Then, at block 710, when the first user inputs a message in the communication interface by using an input device of the UE 610, the message securing module 6102 may obtain the message. At block 712, the message securing module 6102 may encrypt the message with the key. Further, at block 714, the message securing module 6102 may transmit the encrypted message to the message securing module 6122 on the communication channel via the network 630.

On the UE 612 side, at block 716, the message securing module 6122 may receive the encrypted message via the communication channel. At block 718, the message securing module 6122 may decrypt the encrypted message with the key. At block 720, the message securing module 6122 may present the decrypted message in a communication interface linking to the communication channel on a display screen of the UE 612.

Accordingly, the message securing module 6122 may also obtain a message from the second user, encrypt the message, and transmit it to the message securing module 6102. Then, the message securing module 6102 may in turn receive and decrypt the encrypted message from the message securing module 6122 with the key and present the decrypted message on its communication interface.

In this embodiment, the message transmitted via the communication channel may be encrypted. Thus, even if the messaging service provider gained access to the message, the messaging service provider may not know the real contents of the message without the key. Therefore, the first user and the second user may communicate via the communication channel of the target messaging application while the communication contents may be secured. In this case, the communication channel may be implemented as a private communication channel. The messages presented in the communication interface on both UE may be in plaintexts, while the messages presented in an interface for the target messaging application on both UE may be in ciphertexts.

Figure 8:
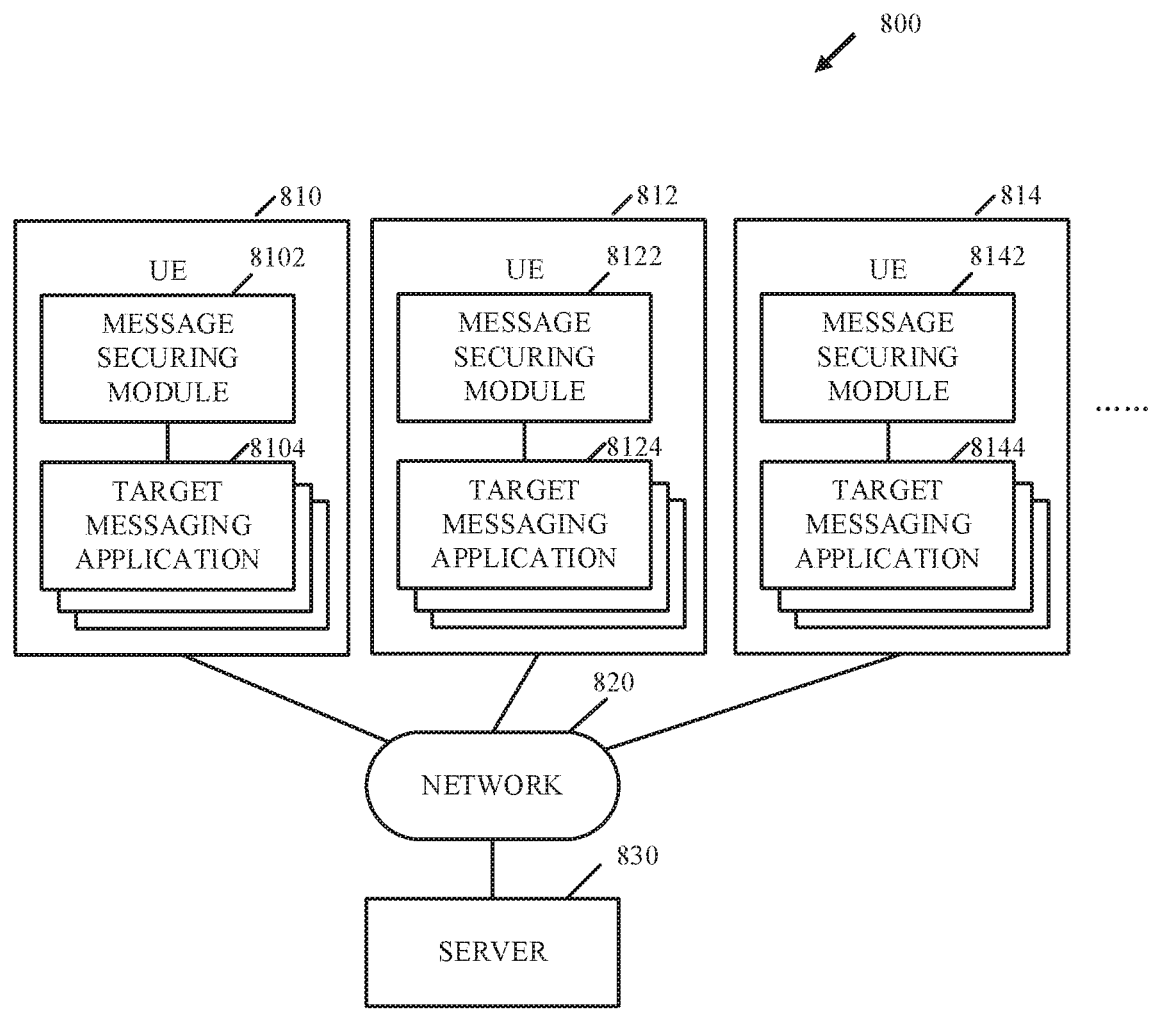
FIG. 8 is a block diagram of an illustrative messaging system according to at least one embodiment.

Referring now to FIG. 8, a block diagram illustrating an exemplary messaging system 800 according to an embodiment of the present disclosure is depicted.

As shown in FIG. 8, the messaging system 800 may include a UE 810, a UE 812, and a UE 814. The UE 810, UE 812, and UE 814 may include the terminal device 500 shown in FIG. 5. According to one embodiment, the messaging system 800 may include any number of UEs in the communication channel and the three UEs (e.g., UE 810, UE 812, UE 814) are shown in FIG. 8 for only illustrative purposes. According to one embodiment, the structure and function of each component/module in the messaging system 800 in FIG. 8 may be similar to the messaging system 600 shown in FIG.6. As such, the similar description will not be repeated herein.

Figure 9:
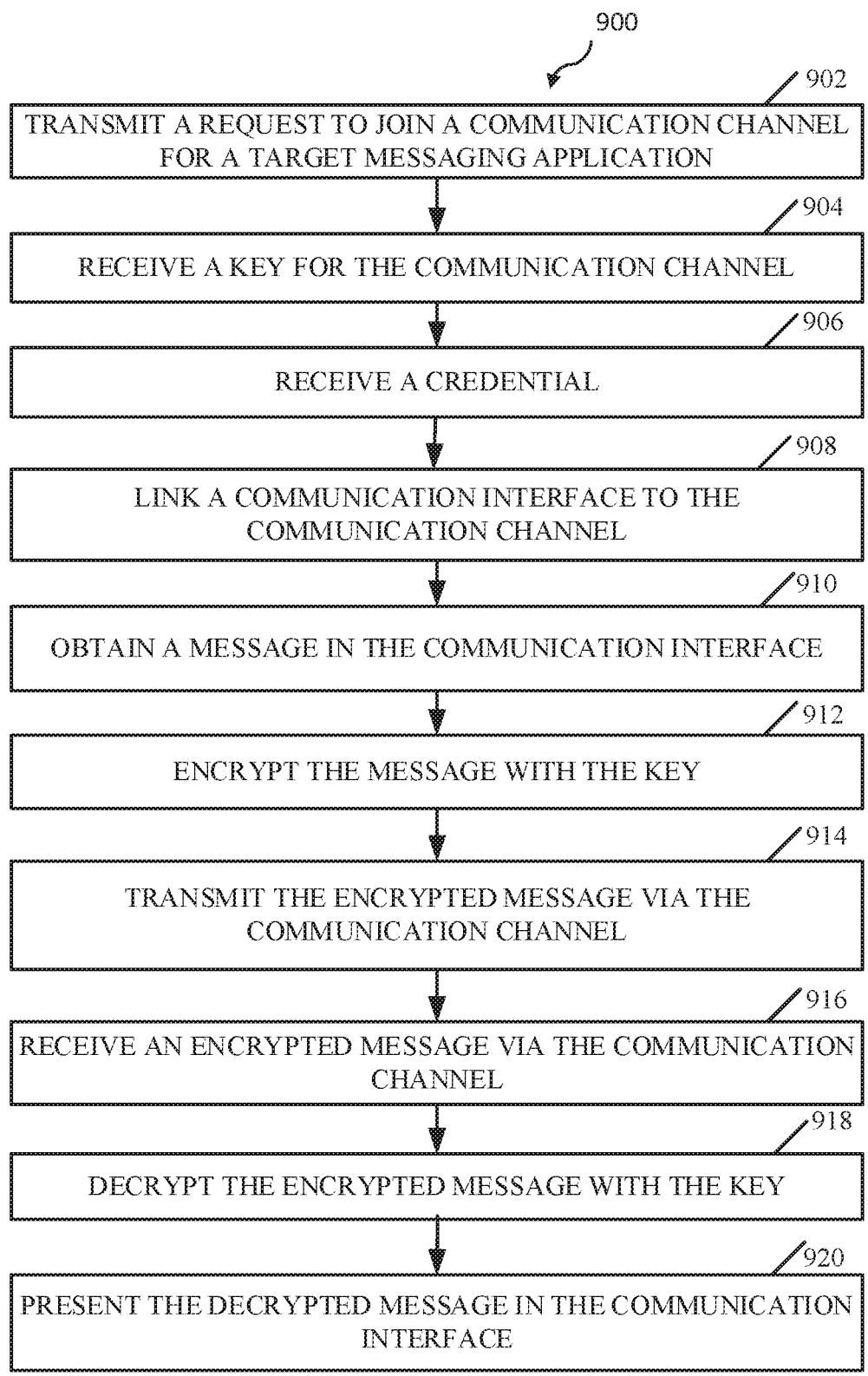
FIG. 9 is an operational flowchart illustrating a process for message securing using the messaging system of FIG. 8, according to at least one embodiment.

Referring additionally to FIG. 9, an operational flowchart illustrating the exemplary process 900 for securing message transmission in the messaging system 800 in FIG. 8 according to an embodiment of the present disclosure is depicted.

In some embodiment, the server 830 may create a communication channel for a target messaging application 8104. The message securing module 8102 of the UE 810, message securing module 8122 of the UE 812, and message securing module 8142 of the UE 814 may, respectively, perform the message securing process in FIG. 9. Description will be made by taking the message securing module 8102 as an example as below.

According to one embodiment, a first user may select the target messaging application 8104 in the application selection presented on the communication interface, as described previously. The message securing module 8102 may search the communication channel over network, in response to a selection of the target messaging application 8104. After the communication channel is found, at block 902, the message securing module 8102 may send a request to the server 830 for joining the communication channel. In some embodiments, the server may check the identification for the UE 810 in response to the request. If the identification is verified by the server 830, the message securing module 8102 may join the communication channel.

Moreover, the server 830 may transmit a key for the communication channel to the message securing module 8102. At block 904, the message securing module 8102 may receive the key from the server 830.

Further, the server 830 may further transmit a credential to the message securing module 8102. The credential may then represent the identification for the UE810. Accordingly, at block 906, the message securing module 8102 may receive the credential from the server 830.

At block 908, the message securing module 8102 may link a communication interface to the communication channel. The communication interface may be corresponding to the plurality of messaging applications on the UE 810. Moreover, the communication interface may be presented on the display device of the UE 810.

At block 910, the message securing module 8102 may obtain a message in the communication interface. At block 912, the message securing module 8102 may encrypt the message with the key. At block 914, the message securing module 8102 may use the received credential to transmit the encrypted message via the communication channel to other UEs in the communication channel, for example, the UE 812 and the UE 814.

Then, for the other UEs, including UE 812 and the UE 814, in the messaging system 800, at block 916, the message securing module 8122 and the message securing module 8142 may receive the encrypted message via the communication channel, respectively. At block 918, the message securing module 8122 and the message securing module 8142 may decrypt the encrypted message with the key, respectively.

At block 920, each of the message securing module 8122 and the message securing module 8142 may link a communication interface to the communication channel and present the decrypted message in the communication interface.

Similar with the above, each of the UE 812 and the UE 814 may receive the key and the credential, generate and encrypt a message, and transmit the encrypted message by using the same credential with the UE 810. Then, the other UEs, for example, the UE 810, may receive and decrypt the encrypted message with the key, and present the decrypted message in its communication interface. Therefore, identification for each of user using the UEs transmitting messages via the communication channel may be hidden.

In a further embodiment, a Public Key Infrastructure ("PKI") digital signature may be implemented to further confirm the real identification for the user using the UE. To prevent a user from pretending to be another user, the respective message securing module may further maintain a public-private key. Each message securing module may encrypt the message with a respective private key. If a user indicated that the user is the user of the UE 812, the message securing module 8102 (of UE 810) and the message securing module 8142 (of UE 814) may search a public key of the UE 812, and decrypt the message from the user with the public key. If the message can be decrypted by the obtained public key, the identification of the user may be authenticated as the user of the UE 812. However, if the message cannot be decrypted by the obtained public key, the identification of the user may not be authenticated as the user of the UE 812, which may indicate that the user may be implementing a fake identification.

Therefore, the process 900 in FIG. 9 may not only hide the contents of communication, but may also the identity of user in the communication channel. In this case, the communication channel can be implemented as a credential shared channel ("CSC").

Additionally, in some embodiments of the present disclosure, a terminal device for securing message transmission may be provided. The terminal device may include one or more processors, a memory coupled to at least one of the processors, and a set of computer program instructions stored in the memory. The set of computer program instructions may be executed by at least one of the processors to perform the above method.

In some other embodiments of the present disclosure, a computer program product for securing message transmission may be provided. The computer program product may include a computer readable storage medium having program instructions embodied therewith. The program instructions executable by a processor may cause the processor to perform the methods disclosed above.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    linking, by a first terminal device, a communication interface to a first communication channel for a target application;
    enabling, by the first terminal device, the first communication channel, in response to a selection of a contact in the target application;
    generating, by the first terminal device, a key for the first communication channel;
    in response to a first message being inputted in the communication interface, encrypting, by the first terminal device, the first message with the key for the first communication channel;
    transmitting, by the first terminal device, the encrypted first message via the first communication channel; and
    providing, by the first terminal device, the key to at least one second terminal device corresponding to the contact selected in the target application.

2. The method of claim 1, wherein providing the key to the at least one second terminal device further comprises:
    enabling, by the first terminal device, a second communication channel between the first terminal device and the at least one second terminal device; and
    transmitting, by the first terminal device, the key to the at least one second terminal device via the second communication channel.

3. The method of claim 1, further comprising:
    registering the first terminal device with a server;
    querying, by the registered first terminal device, the server to retrieve at least one information corresponding to the at least one second terminal device; and
    in response to the at least one information being retrieved from the server, providing, by the registered first terminal device, the key to the at least one second terminal device based on the at one information.

4. The method of claim 3, wherein the at least one information includes a registration status of the at least one second terminal device and an internet protocol ("IP") address of the at least one second terminal device.

5. The method of claim 2, wherein providing the key to the at least one second terminal device further comprises:
    transmitting, by the first terminal device, the key to the server, wherein the server sends the transmitted key to the at least one second terminal device.

6. The method of claim 1, further comprising:
    receiving, by the first terminal device, an encrypted second message;
    decrypting, by the first terminal device, the encrypted second message with the key; and
    presenting, by the first terminal device, the decrypted second message in the communication interface.

7. The method of claim 1, further comprising:
    providing, by the first terminal device, a first credential to the at least one second terminal device, wherein the provided first credential includes a first identification associated with a user using the first terminal device and a second identification associated with the contact.

8. The method of claim 1, wherein the first communication channel is created by a server and the key is generated by the server and wherein the method further comprises:
    in response to a selection of the target application, transmitting, by the first terminal device, a request to the server for joining the first communication channel; and
    receiving, by the first terminal device, the key from the server.

9. The method of claim 8, further comprising:
    receiving, by the first terminal device, a second credential from the server, wherein the received second credential includes an identification associated with a user using the first terminal device.

10. A computer system for securing message transmission, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    linking, by a first terminal device, a communication interface to a first communication channel for a target application;
    enabling, by the first terminal device, the first communication channel, in response to a selection of a contact in the target application;
    generating, by the first terminal device, a key for the first communication channel;
    in response to a first message being inputted in the communication interface, encrypting, by the first terminal device, the first message with the key for the first communication channel;
    transmitting, by the first terminal device, the encrypted first message via the first communication channel; and
    providing, by the first terminal device, the key to at least one second terminal device corresponding to the contact selected in the target application.

11. The computer system of claim 10, wherein providing the key to the at least one second terminal device further comprises:

enabling, by the first terminal device, a second communication channel between the first terminal device and the at least one second terminal device; and transmitting, by the first terminal device, the key to the at least one second terminal device via the second communication channel.

12. The computer system of claim 10, further comprising:
registering the first terminal device with a server;
querying, by the registered first terminal device, the server to retrieve at least one information corresponding to the at least one second terminal device; and
in response to the at least one information being retrieved from the server, providing, by the registered first terminal device, the key to the at least one second terminal device based on the at one information.

13. The computer system of claim 11, wherein providing the key to the at least one second terminal device further comprises:
transmitting, by the first terminal device, the key to the server, wherein the server sends the transmitted key to the at least one second terminal device.

14. The computer system of claim 10, further comprising:
receiving, by the first terminal device, an encrypted second message;
decrypting, by the first terminal device, the encrypted second message with the key; and
presenting, by the first terminal device, the decrypted second message in the communication interface.

15. The computer system of claim 10, further comprising:
providing, by the first terminal device, a first credential to the at least one second terminal device, wherein the provided first credential includes a first identification associated with a user using the first terminal device and a second identification associated with the contact.

16. The computer system of claim 10, wherein the first communication channel is created by a server and the key is generated by the server and wherein the method further comprises:
in response to a selection of the target application, transmitting, by the first terminal device, a request to the server for joining the first communication channel; and
receiving, by the first terminal device, the key from the server.

17. The computer system of claim 16, further comprising:
receiving, by the first terminal device, a second credential from the server, wherein the received second credential includes an identification associated with a user using the first terminal device.

18. A computer program product for securing message transmission, the computer program product comprising a computer readable storage medium having program instructions embodied therewith, the program instructions executable by a processor to cause the processor to:
link, by a first terminal device, a communication interface to a first communication channel for a target application;
enable, by the first terminal device, the first communication channel, in response to a selection of a contact in the target application;
generating, by the first terminal device, a key for the first communication channel;
in response to a first message being inputted in the communication interface, encrypt, by the first terminal device, the first message with the key for the first communication channel;
transmit, by the first terminal device, the encrypted first message via the first communication channel; and
provide, by the first terminal device, the key to at least one second terminal device corresponding to the contact selected in the target application.

* * * * *